A. OLLARIU.
PROTRACTOR.
APPLICATION FILED AUG. 31, 1916.
1,228,697.
Patented June 5, 1917.
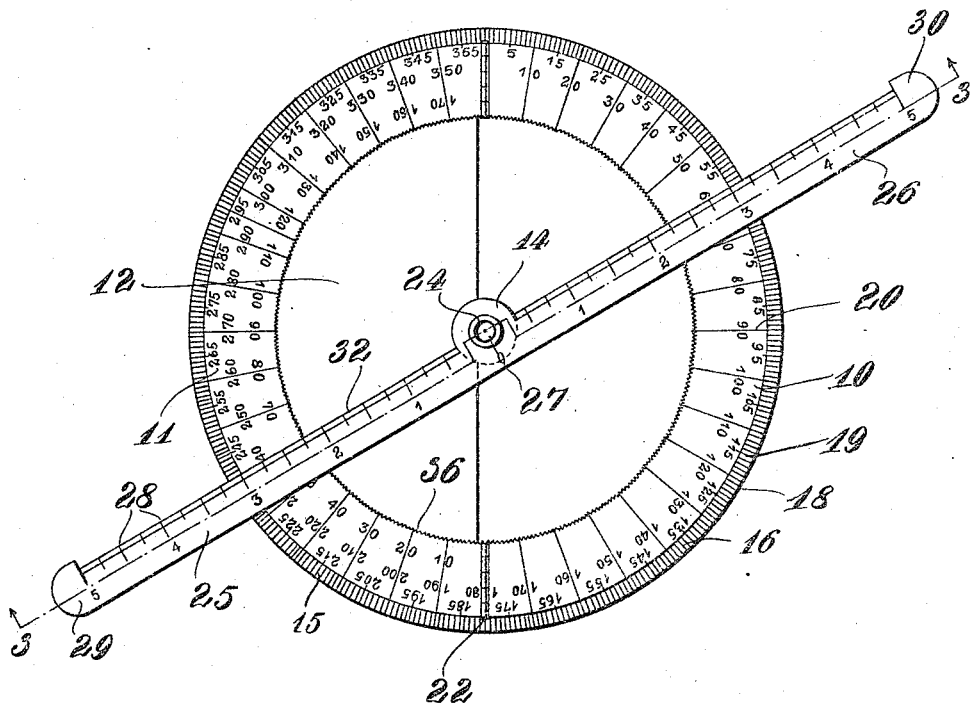
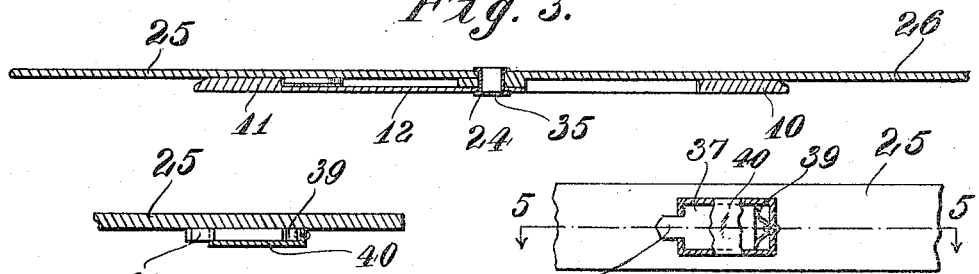
Inventor
Anton Ollariu
By his Attorney
Oscar Geier

UNITED STATES PATENT OFFICE.

ANTON OLLARIU, OF PHILADELPHIA, PENNSYLVANIA.

PROTRACTOR.

1,228,697. Specification of Letters Patent. Patented June 5, 1917.

Application filed August 31, 1916. Serial No. 117,834.

*To all whom it may concern:*

Be it known that I, ANTON OLLARIU, a subject of the King of Hungary, and a resident of Philadelphia, in the county of Philadelphia and State of Pennsylvania, have invented certain new and useful Improvements in Protractors, of which the following is a specification.

This invention relates to improvements in protractors, such as are used in plotting angles in mechanical work, surveying, maps and similar work, and the principal object is to provide a protractor of the type mentioned which is capable of being folded into a small compass, so that it may be readily carried in the pocket.

Another object is to provide means whereby angles may be determined not only visually, but by the sense of touch as well, the means also acting to hold the scale in an adjusted position, and finally, to provide an inexpensive light, simple and accurate substitute for the type of protractors now in common use.

These and other objects are attained by the novel design and construction of parts hereafter disclosed and shown in the accompanying drawing, forming a material part of this specification, and in which:—

Figure 1 is a plan view of the protractor extended as in use.

Fig. 2 is a side elevation of the same.

Fig. 3 is a sectional view taken substantially on line 3—3 of Fig. 1.

Fig. 4 is an enlarged fragmental bottom plan view of the scale, and

Fig. 5 is a longitudinal sectional view taken on line 5—5 of Fig. 4.

The apparatus, which is preferably made of some transparent material as celluloid or the like, is composed of two arcuate or semi-circular plates 10 and 11, the latter of which embraces a thinner plate 12 having a central hub portion 14 extending so as to include the center of the instrument.

Both of the plates 10 and 11 have beveled edges respectively 15 and 16 upon which are the usual graduations 18 indicating full degrees, lines 19 being extended past the beveled portion of the surface of the rings as indicated for each fifth degree, while other lines 20 extend radially across the entire upper surface to indicate each tenth degree.

These semi-circular plates are joined by means of hinges 22, the axis of which is directly on the center line of the apparatus as will be clearly seen from an inspection of Figs. 1 and 2.

Attached by a central tubular rivet 24 are the elements 25 and 26 of the scale, the same being made of similar material and joined at the center by means of the tubular rivet 24, so as to fold in the manner of an ordinary foldable two foot rule.

The upper surface of the scale is divided into inches represented by the lines 28, the ends 29 and 30 extending slightly past and furnished with rounded ends as shown.

Thus the scale may be moved so that the front beveled edge 32 may be brought closely into register with the radial lines on the plates, so that degrees may be visually determined and set off.

The tubular rivet 24 is preferably covered upon its lower side with a thin transparent plate 35 in which, at the exact center, is formed a fine perforation receptive of a pin or stylus and through which the position of the instrument may be accurately determined.

In order to hold the scale in its adjusted position, a plurality of serrations 36 are formed upon the inner annular edge of both plates 10 and 11, the angle between each of the serrations being disposed in register with the degree marks upon its outer circumference, and secured to the lower side of the scale 25 and 26 are slides 37 having an extending point 38 normally projected outward by means of the flat spring 39, the construction being covered by an outer casing 40 as shown in Figs. 4 and 5.

Thus in rotating the scale with reference to the plates when the same are held stationary in adjustment, the point 38 enters the serrations 36 under pressure of the spring 39, so that as the scale is moved, the sense of touch will determine that the edge is in alinement with one of the degree marks, while the click is audible to the operator.

While the spring will hold the scale substantially rigid so that the instrument may be removed, it is not so stiff as to prevent the scale from being easily rotated.

In operation the parts are extended as shown in Fig. 1, and when in a collapsed condition obviously the two parts of the scale are brought together and the plates closed upon themselves by the hinges 22.

Having thus described my invention, what

I claim as new and desire to secure by Letters Patent, is:—

1. In a protractor, the combination with a pair of semi-circular plates having graduations upon their upper face, hinges connecting said plates, the axis of said hinges being on line with the center of the apparatus, and a folding scale rotatably engaged with said plates in such manner that it may move therearound.

2. In a protractor, the combination with a pair of circular plates having beveled edges, degree marks formed upon said edges, a thinner plate extending inwardly from one of said semi-circular plates, a scale having a hinge at its center, said hinge being at the center of said plate, and a tubular rivet passing through said scale and the mentioned plate whereby the scale may be rotated axially of said plates.

3. In a protractor of the class described, the combination with two semi-circular rings having graduations upon their upper surface, a plate extending from one of said rings including the center thereof, hinges connecting said rings, the axis of said hinges being in alinement with the center of said rings, and a jointed scale pivotally held to the center of said plate, said scale being movable completely over the surface of the instrument.

4. In a protractor, the combination of two semi-circular rings having divisions upon their upper surface, a central hub formed with one of said rings, a plurality of serrations formed in the inner annular edge of said rings, said serrations registering with the mentioned divisions, a scale having a central joint rotatably engaged with said hub and hinged connections between said rings, the axis of the hinges being co-incident with the central joint of said scale.

Signed at Philadelphia, in the county of Philadelphia, and State of Pennsylvania, this first day of July A. D. 1916.

ANTON OLLARIU.

Copies of this patent may be obtained for five cents each, by addressing the "Commissioner of Patents, Washington, D. C."